UNITED STATES PATENT OFFICE 1,980,812

PREPARATION OF TITANIUM COMPOUNDS

William Basil Llewellyn and Howard Spence, Manchester, England, assignors to Peter Spence & Sons, Limited, Manchester, England No Drawing. Application July 3, 1931, Serial No. 548,704. In Great Britain July 5, 1930

7 Claims. (Cl. 23—117)

In the preparation of compounds of titanium for use in the arts, difficulty is experienced in obtaining titanic acid in a pure and also readily acid-soluble condition from impure sulphate or sulphate-containing solutions prepared from mineral or other sources of titanic acid. It is known to separate titanic acid from such solutions in the form of crystallized soluble basic titanium alkali sulphates of the general formula

$TiO_2SO_3x_2OSO_3Aq.$ where $x$ represents NaK or $NH_4$, and in the form of crystallized soluble basic sulphates $TiO_2SO_3Aq.$, but such compounds have to be separated from very acid solutions and are difficult to obtain in a state of purity. Their resolution and precipitation from acid solutions is relatively costly. It is also known to precipitate titanium oxide by hydrolysis by heating to comparatively high temperatures its solutions in mineral acids in the form of meta-titanic acid, basic sulphates or titanium or mixtures of these, but such products are only very difficulty soluble in acids. It is also known to separate titanium oxide from mixtures containing iron, aluminium and other metals in solution by first reducing the titanic oxide ($TiO_2$) in the impure acid solutions by means of, e. g., zinc, iron, etc., or by means of electrolysis, until it is converted into titanous oxide ($Ti_2O_3$) and then by addition of alkali or of sulphite, acetate or formate to obtain the titanium as titanous oxide hydrate which, however, is bulky and difficult to separate from the liquor from which it is precipitated. It is also known to obtain a bulky white flocculent precipitate of ortho-titanic hydroxide by adding alkali hydroxides, sulphides and carbonates, barium carbonate etc. to a solution of a titanic salt, but such titanic hydroxide is extremely difficult to filter or otherwise separate from its mother liquor and becomes much less soluble in acids on standing.

Now we have found that by controlled but incomplete neutralization of the solution, together with suitable dilution, at ordinary temperatures or at a temperature not high enough to produce the very difficultly acid-soluble forms, titanic acid may readily be separated from such impure sulphate-containing solutions in a condition of much greater purity than is practicable in the case of the soluble salts indicated above and in the form of readily filterable and washable basic sulphates containing from about 0.5 to about 0.25 mol. $SO_3$ (normally from about 0.45 or 0.4 mol. to 0.3 mol.): 1 mol. $TiO_2$, which, while insoluble in water, are readily soluble in the presence of even very small additional amounts of suitable inorganic and organic acids, and from which, if a still higher degree of purity is desired, they may then similarly be reprecipitated at the minimum cost, and our invention consists in such preparation of such basic titanic sulphates and in the preparation of other titanium compounds therefrom.

Such impure titanium solutions often contain considerable quantities of aluminium, iron and chromium, the two last named particularly being for some purposes undesirable. We have found that if such a solution be neutralized just sufficiently to precipitate at a suitable dilution and temperature substantially all the titanium, almost all the iron (if in the ferrous state) and the greater part of the chromium remain dissolved; if neutralization be carried further much more of the impurities, particularly chromium, is precipitated; but if neutralization and dilution are controlled so that a part of the titanium is not precipitated, the basic titanium sulphate then obtained besides being very low in iron and aluminium, is much freer from chromium. The non-precipitated titanium may be separated afterwards as basic sulphate by further neutralization (excess being avoided) and if not pure enough readily re-dissolved by acid or acid liquors.

The effect of increasing the dilution is to lessen the degree of neutralization necessary to obtain the same percentage precipitation, or to increase the precipitation for the same neutralization; also in some cases increasing the dilution improves the filterability of the precipitate. We find we are able to neutralize an impure titanium solution to such a degree that although, while concentrated it does not precipitate, it gives a large yield of basic titanium sulphate on dilution.

We usually prefer to perform the precipitation in the cold, as although raising the temperature to e. g., 50° C. gives the basic titanic sulphate with rather less neutralization, there is then some tendency for it to be less readily soluble in acids than when precipitated at the ordinary temperature.

We find that the presence in solution of much sulphate tends to give a precipitate which filters badly or may be gelatinous, and also tends to lessen its purity, whilst the substitution of sulphate by chloride tends to improve filterability and purity. These desirable effects may to a considerable extent be realized by the addition of a chloride, e. g., sodium chloride, which does not precipitate sulphate, but usually we prefer to remove most of the excess sulphate from solution either by concurrent partial neutralization by e. g., calcium carbonate or by double decomposition with an alkali-earth chloride, e. g. calcium chloride, or by both methods combined. If the alkali-earth sulphate thus precipitated, or a portion of it, is to form part of the product, the basic titanic sulphate may be precipitated in its presence. On the other hand, if too little sulphate be present this also will tend to produce a precipitate which filters badly, and we therefore prefer that the sulphate in solution should be not much less than about 0.45 mol. $SO_3$:1 mol. $TiO_2$, and if employing an original chloride solution we add to it either a suitable soluble sulphate or sulphuric acid to give approximately such ratio.

Suitable neutralizing agents are e. g., alkali, ammonium or magnesium carbonate, bicarbonate or hydroxide, and in some cases calcium or barium carbonate or hydroxide, usually added as a solution or suspension.

We have also found that the basic titanium sulphate may be further purified by treatment with suitable weak acids or very dilute strong acids under conditions which do not effect material solution of the titanic acid, e. g., by washing with very dilute sulphuric acid containing, e. g., about 0.2% $SO_3$.

In carrying our invention into effect we may suitably employ a cold solution of titanic acid in sulphuric acid, or a solution of titanium chloride containing sulphuric acid, preferably with the iron fully or almost fully reduced to the ferrous condition, and neutralize by the addition of a suitable neutralizing agent, e. g. alkali carbonate or bi-carbonate or alkaline-earth carbonate, preferably calcium carbonate in a fine state of division, nearly up to the point at which by further neutralization titanic acid would be precipitated from solution. We then, if desired, separate the precipitated insoluble sulphate etc. if, for example, calcium carbonate has been employed, dilute the solution further, if necessary, and continue its neutralization suitably by adding alkali carbonate or alkaline bi-carbonate, for example, $Na_2CO_3$, very gradually and preferably in relatively dilute solution with agitation, until a large proportion of the titanic acid is precipitated in the form of the desired basic sulphate containing about one-half mol. of combined $SO_3$ or less per molecule of $TiO_2$. When the point is reached at which, after perhaps a little delay, the desired basic titanium sulphate begins to form, relatively very little further neutralizing agent is required to precipitate practically all the titanium in that form, and, at the point mentioned, while the first effect of the soda or other neutralizing agent in solution is to produce an immediate and apparently gelatinous precipitate which evidently re-dissolves, following this the desired basic titanium sulphate gradually appears, and its quantity may go on increasing somewhat for a considerable time without further neutralization or dilution. Such precipitation may, if desired, be carried out in stages to separate products of somewhat different quality. If the presence of alkaline-earth sulphates is desired, we may employ alkaline-earth carbonate as the neutralizing agent. Alternatively, we may neutralize as described so far as possible while keeping the titanium solution in a relatively concentrated state and thereafter obtain the separation of the desired readily acid-soluble basic sulphate by gradual dilution with water. In contra-distinction to the methods hitherto employed for the separation from solutions of titanic acid in the form of more basic sulphate compounds, we carry out the process in cold solutions or in solutions not hot enough to give these very difficultly soluble forms and thereby obtain the desired form of readily acid-soluble basic titanium sulphate which is also in a condition in which it settles readily from solution and may be filtered and washed with facility.

The basic titanic sulphate may be readily dried to a condition in which it may contain e. g. 50% or more of titanic acid and still be soluble in acids, though in some cases not quite so readily as before.

The basic titanic sulphate is readily dissolved by acids such as sulphuric, hydrochloric, nitric or oxalic. Besides being easily dissolved by acids, the basic titanic sulphate is very readily acted on by alkalies even in the cold to give titanic hydroxide which also is easily soluble in acids. By such means we may conveniently produce relatively pure solutions of titanic salts whose acidity may be controlled within wide limits, and which may be used by known means as the source of other titanium compounds, or themselves utilized technically. The ability to obtain titanic acid in a high state of purity from the basic titanium sulphate and its extremely easy conversion into other titanium compounds make it especially suitable for their preparation and for the manufacture of pigments. Where, for example, use as pigment is intended we may, if desired, precipitate the basic titanium sulphate in the presence of other substances also suitable for the purpose, e. g., calcium and barium sulphates. It may be readily converted into the known more basic and insoluble sulphate by suitable means, e. g., by boiling in a suitable quantity of water, or it may readily be dissolved in the required amount of relatively dilute acid to furnish a solution which is very suitable for further use or for treatment by known methods.

The following are simply illustrative examples of our invention:—

*Example 1.*—An impure titanic sulphate solution prepared by known methods containing about 17 grams $TiO_2$ and 34 grams $SO_3$ per 100 cc. and with its iron practically all in the ferrous state is considerably diluted and a thin suspension of finely-divided calcium carbonate gradually run in under agitation, its quantity being less than sufficient to cause a permanent precipitate of $TiO_2$, e. g., about 20 grams per 100 cc. of the original solution, and preferably after some time the gypsum is filtered off and washed with washes from previous operations and finally water. The titanic solution, now largely neutralized, is diluted with the washes and water until it contains e. g., a little over 2% $TiO_2$ by volume, and a 4% soda carbonate solution gradually run in under agitation until a slight permanent precipitate begins to appear, which usually occurs when the ratio of acid, after allowing for other bases present, is about 0.5 mol. $SO_3$:1 mol. $TiO_2$. For the further neutralization necessary weaker soda solution is suitable as it gives a more quickly soluble temporary precipitate than does 4% soda, and of this only a quantity equivalent to about 0.1 mol.:1 mol. $TiO_2$ may now be required to bring down nearly the whole of the $TiO_2$ in the desired form. The lapse of time alone increases the precipitation somewhat, thus a sample which showed 30% precipitation 1 hour after the last addition of soda showed 46% 12 hours after. Dilution acts in the same direction, thus a sample which showed 67% precipitation was diluted with an equal volume of water and in 3 hours showed 92% whilst an undiluted sample then showed 72%. By controlling these conditions the percentage precipitation can, of course, be regulated as desired, bearing in mind that very high direct yield figures tend to give a rather less pure product. The precipitate is settled or filtered and washed. The mother liquor may be treated with a little more soda to bring down practically all the residual $TiO_2$, time being allowed for this to occur without adding excess soda, and the rather less pure basic titanic sulphate so obtained may e. g., be returned to process by dissolving in the stock titanic sulphate solution.

Example 2.—As Example 1, but besides the calcium carbonate suspension a solution of calcium chloride sufficient to leave e. g., about 0.45 mol. total $SO_3$:1 mol. $TiO_2$ in the solution is also gradually run in under agitation. As some of the calcium is not precipitated an excess over the chemical equivalent of the sulphate to be brought down is necessary, and the required amount may be about 25 grams $CaCl_2$ per 100 cc. of titanic sulphate solution taken. Following the precipitation of the basic titanic sulphate and the recovery of residual $TiO_2$, if any, as aforementioned, the mother liquor may be treated for the precipitation of impurities with e. g., milk of lime or with calcium carbonate if the iron is converted to the ferric state, and the solution, mainly then containing calcium chloride, re-used.

Example 3.—The impure titanic sulphate solution is diluted to e. g., about 2 grams $TiO_2$ per 100 cc., a quantity of sodium chloride, e. g., 5 mols. NaCl:1 mol. $TiO_2$ added, and a dilute solution of sodium carbonate, e. g. 4 or 5%, run in until a slight permanent precipitate appears, after which 2% soda is slowly run in under agitation and the precipitation of the desired basic titanic sulphate controlled as in Example 1.

Example 4.—The impure titanic sulphate solution is neutralized in the cold, suitably by calcium carbonate and with the least possible dilution, to such an extent that titanium is not permanently precipitated whilst the solution is concentrated, but much basic titanic sulphate would come down if greatly diluted. It may then show only slightly acid to a Congo red solution, and after allowing for other bases present may contain acid equivalent to about 0.5 mol. $SO_3$:1 mol. $TiO_2$. The quantity of $CaCO_3$ thus required may be about 25 grams per 100 cc. of original solution. After precipitation the gypsum may be washed with water slightly acidulated to prevent decomposition on the filter, and the solution largely and gradually diluted with water, e. g., to 10 times its original volume, whereby the desired basic titanic sulphate is precipitated.

What we claim as our invention and desire to secure by Letters Patent is:—

1. The process for producing basic titanic sulphate insoluble in water but readily soluble in acids and containing less than 0.5 mol. of $SO_3$ to each mol. of $TiO_3$ which process includes precipitation at a temperature below 50° centigrade from a solution containing titanic sulphate by controlled, incomplete neutralization, the neutralization being insufficient to precipitate all of the $TiO_2$ in the solution.

2. The process for producing basic titanic sulphate insoluble in water but readily soluble in acids and containing less than 0.5 mol. of $SO_3$ to each mol. of $TiO_3$ which process includes partially neutralizing a solution containing titanic sulphate by adding thereto an alkali-earth carbonate, and precipitating of the titanic sulphate by further neutralization of the solution by treating the solution with an alkali carbonate, the precipitation being carried on at a temperature below 50° centigrade.

3. The process for producing basic titanic sulphate insoluble in water but readily soluble in acids and containing less than 0.5 mol. of $SO_3$ to each mol. of $TiO_3$ which process includes treating a solution containing titanic sulphate with a chloride to substitute chloride for a part of the sulphate, and thereafter precipitating the basic titanic sulphate by incomplete neutralization of the solution, the solution being maintained at a temperature less than 50° centigrade.

4. The process for producing basic titanic sulphate insoluble in water but readily soluble in acids and containing less than 0.5 mol. of $SO_3$ to each mol. of $TiO_3$ which process comprises precipitation by neutralizing a solution of a titanic chloride solution containing sufficient sulphate to provide at least 0.45 mol. of $SO_3$ for each mol. of $TiO_2$, the precipitation being carried on at a temperature below 50° centigrade.

5. The process for producing basic titanic sulphate insoluble in water but readily soluble in acids and containing less than 0.5 mol. of $SO_3$ to each mol. of $TiO_3$ which process comprises precipitation by neutralization of a solution containing titanic sulphate, the neutralization being carried on in the presence of an added chloride which does not effect precipitation of the sulphate radical, and at a temperature below 50° centigrade.

6. The process for producing basic titanic sulphate insoluble in water but readily soluble in acids and containing less than 0.5 mol. of $SO_3$ to each mol. of $TiO_3$ which process includes the treating at a temperature below 50° centigrade of a solution containing titanic sulphate with dilute suspension of calcium carbonate in an amount insufficient to cause a permanent precipitate of $TiO_2$, filtering off the gypsum, diluting the titanic solution until it contains slightly more than 2% $TiO_2$ by volume, and adding a 4% soda carbonate solution to cause precipitation.

7. Basic titanium sulphate prepared in accordance with the process of claim 6.

WILLIAM BASIL LLEWELLYN.
HOWARD SPENCE.